US008806477B2

(12) United States Patent
DeHaan (10) Patent No.: US 8,806,477 B2
(45) Date of Patent: Aug. 12, 2014

(54) SPACE EFFICIENT SOFTWARE PACKAGE MANAGEMENT

(75) Inventor: Michael Paul DeHaan, Morrisville, NC (US)

(73) Assignee: Red Hat, Inc., Raleigh, NC (US)

( * ) Notice: Subject to any disclaimer, the term of this patent is extended or adjusted under 35 U.S.C. 154(b) by 686 days.

(21) Appl. No.: 12/610,006

(22) Filed: Oct. 30, 2009

(65) Prior Publication Data

US 2011/0107326 A1     May 5, 2011

(51) Int. Cl.
*G06F 9/44*     (2006.01)
*G06F 9/445*     (2006.01)

(52) U.S. Cl.
USPC ........... 717/175; 717/120; 717/169; 717/170; 717/172; 717/177; 707/638; 707/664

(58) Field of Classification Search
None
See application file for complete search history.

(56) References Cited

U.S. PATENT DOCUMENTS

| | | | |
|---|---|---|---|
| 5,732,265 A * | 3/1998 | Dewitt et al. .......................... 1/1 |
| 6,438,749 B1 | 8/2002 | Chamberlain |
| 6,901,413 B1 * | 5/2005 | Wu ............... 707/692 |
| 6,993,539 B2 * | 1/2006 | Federwisch et al. ................... 1/1 |
| 7,013,455 B1 * | 3/2006 | Ku et al. ........................ 717/127 |
| 7,240,336 B1 | 7/2007 | Baker |
| 7,512,939 B2 | 3/2009 | Brookner |
| 7,624,393 B2 | 11/2009 | Egan et al. |
| 7,657,885 B2 | 2/2010 | Anderson |
| 7,836,341 B1 | 11/2010 | Krishnan |
| 8,131,687 B2 * | 3/2012 | Bates et al. ................... 707/692 |
| 8,180,740 B1 * | 5/2012 | Stager et al. ................... 707/692 |
| 8,548,992 B2 * | 10/2013 | Abramoff et al. ............. 707/726 |
| 2003/0051235 A1 | 3/2003 | Simpson |
| 2003/0229890 A1 * | 12/2003 | Lau et al. ....................... 717/168 |
| 2005/0131902 A1 * | 6/2005 | Saika .............................. 707/10 |
| 2005/0210459 A1 | 9/2005 | Henderson et al. |
| 2005/0273486 A1 * | 12/2005 | Keith, Jr. ....................... 709/200 |
| 2006/0130047 A1 * | 6/2006 | Burugapalli ................... 717/170 |
| 2006/0190773 A1 | 8/2006 | Rao et al. |
| 2006/0230398 A1 | 10/2006 | Yokota |
| 2007/0027929 A1 * | 2/2007 | Whelan ......................... 707/200 |
| 2007/0038991 A1 | 2/2007 | Schuft et al. |
| 2007/0157192 A1 | 7/2007 | Hoefler et al. |
| 2007/0169075 A1 | 7/2007 | Lill et al. |
| 2008/0134165 A1 | 6/2008 | Anderson et al. |
| 2008/0141240 A1 | 6/2008 | Uthe |
| 2008/0201705 A1 | 8/2008 | Wookey |
| 2009/0013319 A1 | 1/2009 | Williams et al. |
| 2009/0037897 A1 | 2/2009 | Dull et al. |
| 2009/0300595 A1 | 12/2009 | Moran et al. |

(Continued)

OTHER PUBLICATIONS

Seth Kelby Vidal, "Systems and Methods for Initiating Software Repairs in conjunction With Software Package Updates", U.S. Appl. No. 12/714,200, filed Feb. 26, 2010.

(Continued)

*Primary Examiner* — Michael Sun
(74) *Attorney, Agent, or Firm* — Lowenstein Sandler LLP (57) ABSTRACT

A space management tool can consolidate the duplicate files in the software packages while maintaining the file structure of the software packages. The space management tool can search the software packages to identify duplicate files and consolidate the duplicate files without altering the file structure of the software packages. In particular, the space management tool can consolidate the storage space utilized by the software packages by removing duplicate files in the software packages and replacing the removed files with a reference to the remaining file.

20 Claims, 4 Drawing Sheets

(56) References Cited

U.S. PATENT DOCUMENTS

| | | | |
|---|---|---|---|
| 2010/0023933 A1 | 1/2010 | Bryant et al. | |
| 2010/0058308 A1 | 3/2010 | Demshur et al. | |
| 2010/0058314 A1 | 3/2010 | Wang | |
| 2010/0083243 A1 | 4/2010 | Mincarelli et al. | |
| 2010/0293205 A1* | 11/2010 | Baker et al. | 707/812 |
| 2011/0099154 A1* | 4/2011 | Maydew et al. | 707/692 |
| 2011/0185149 A1* | 7/2011 | Gruhl et al. | 711/206 |

OTHER PUBLICATIONS

Seth Kelby Vidal, "Systems and Methods for Diagnostic Notification via Package Update Manager", U.S. Appl. No. 12/714,258, filed Feb. 26, 2010.

Seth Kelby Vidal, "Systems and Methods for Managing Software Package Updates Using Communication Pipes", U.S. Appl. No. 12/714,208, filed Feb. 26, 2010.

Seth Kelby Vidal, "Systems and Methods for Generating and Storing Translation Information as Package Metadata", U.S. Appl. No. 12/714,171 filed Feb. 26, 2010.

Seth Kelby Vidal, "Systems and Methods for Generating Predictive Diagnostics via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,850, filed Sep. 1, 2010.

Seth Kelby Vidal, "Systems and Methods for Generating Cached Representations of Encoded Package Profile", U.S. Appl. No. 12/788,139, filed May 26, 2010.

Seth Kelby Vidal, "Systems and Methods for Generating Cached Representations of Host Package Inventories in Remote Package Repositories", U.S. Appl. No. 12/790,699, flied May 28, 2010.

Seth Kelby Vidal, "Systems and Methods for Generating Package Profiles in Software Package Repositories Using Selective Subsets of Packages", U.S. Appl. No. 12/873,557, filed Sep. 1, 2010.

Seth Kelby Vidal, "Systems and Methods for Generating an Encoded Package Profile Based on Executing Host Processes", U.S. Appl. No. 12/787,104, filed May 26, 2010.

Seth Kelby Vidal, "Systems and Methods for Restoring Machine State History Related to Detected Faults in Package Update Process", U.S. Appl. No. 12/788,036, filed May 26, 2010.

Seth Kelby Vidal, "Systems and Methods for Generating Client Qualification to Execute Package Update Manager", U.S. Appl. No. 12/788,458, filed May 27, 2010.

Seth Kelby Vidal, "Systems and Methods for Determining When to Update a Package Manager Software", U.S. Appl. No. 12/790,752, filed May 28, 2010.

Seth Kelby Vidal, "Systems and Methods for Generating Exportable Encoded Identifications of Networked Machines Based on Installed Package Profiles", U.S. Appl. No. 12/768,416, filed Apr. 27, 2010.

Seth Kelby Vidal, "Systems and Methods for Tracking Computing Systems Utilizing Software Repositories", U.S. Appl. No, 12/955,671, filed Nov. 29, 2010.

Seth Kelby Vidal, "Systems and Methods for Automatic Upgrade and Downgrade in Package Update Operations", U.S. Appl. No. 12/892,227. filed Sep. 28, 2010.

Seth Kelby Vidal, "Systems and Methods for Detection of Malicious Software Packages", U.S. Appl. No. 12/898,876, filed Oct. 6, 2010.

Seth Kelby Vidal, "Systems and Methods for Managing Versions of Software Packages", U.S. Appl. No. 13/037,363, filed Mar. 1, 2011.

* cited by examiner

SPACE EFFICIENT SOFTWARE PACKAGE MANAGEMENT

FIELD

This invention relates generally to computer software installation and management for a computing system.

DESCRIPTION OF THE RELATED ART

Today, a person using a computing system has a variety of avenues for obtaining software and installing the software on the computing system, such as purchasing physical media and downloading the software over a network. When downloading the software over a network, the person can acquire and install the software using a software package management system. The software package management system typically consists of a software repository which stores and maintains various software packages. The software packages typically consist of software stored in an archive format that includes data for installing the software.

Often, each software repository stores and maintains software packages with overlapping content. For example, a software repository may maintain software packages that include various distributions of the same software, which may contain the same files. Typically, the software repository maintains a separate copy of each software package even if the package contains overlapping content. As such, the software repository requires significant storage space in order to maintain the software packages.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for managing software packages. More particularly, the present teachings relate to systems and methods for efficiently maintaining multiple software packages with overlapping content.

According to embodiments, a software repository can maintain multiple software packages. In order to efficiently maintain the multiple software packages and conserve space, the software repository can utilize a space management tool. The space management tool can be configured to consolidate the duplicate files in the software packages while maintaining the file structure of the software packages. To achieve this, the space management tool can be configured to search the software packages to identify duplicate files and consolidate the duplicate files without altering the file structure of the software packages. In particular, the space management tool can be configured to consolidate the storage space utilized by the software packages by removing duplicate files in the software packages and replacing the removed files with a reference to the remaining file. The space management tool can be configured to utilize references such as hard links and symbolic links to replace the removed duplicate files.

By utilizing the space management tool, a software repository can maintain multiple software packages with overlapping content while reducing the storage space required by the software packages. Additionally, the software repository can reduce the storage space required by the software packages without altering the file structure of the software packages.

Figure 1:
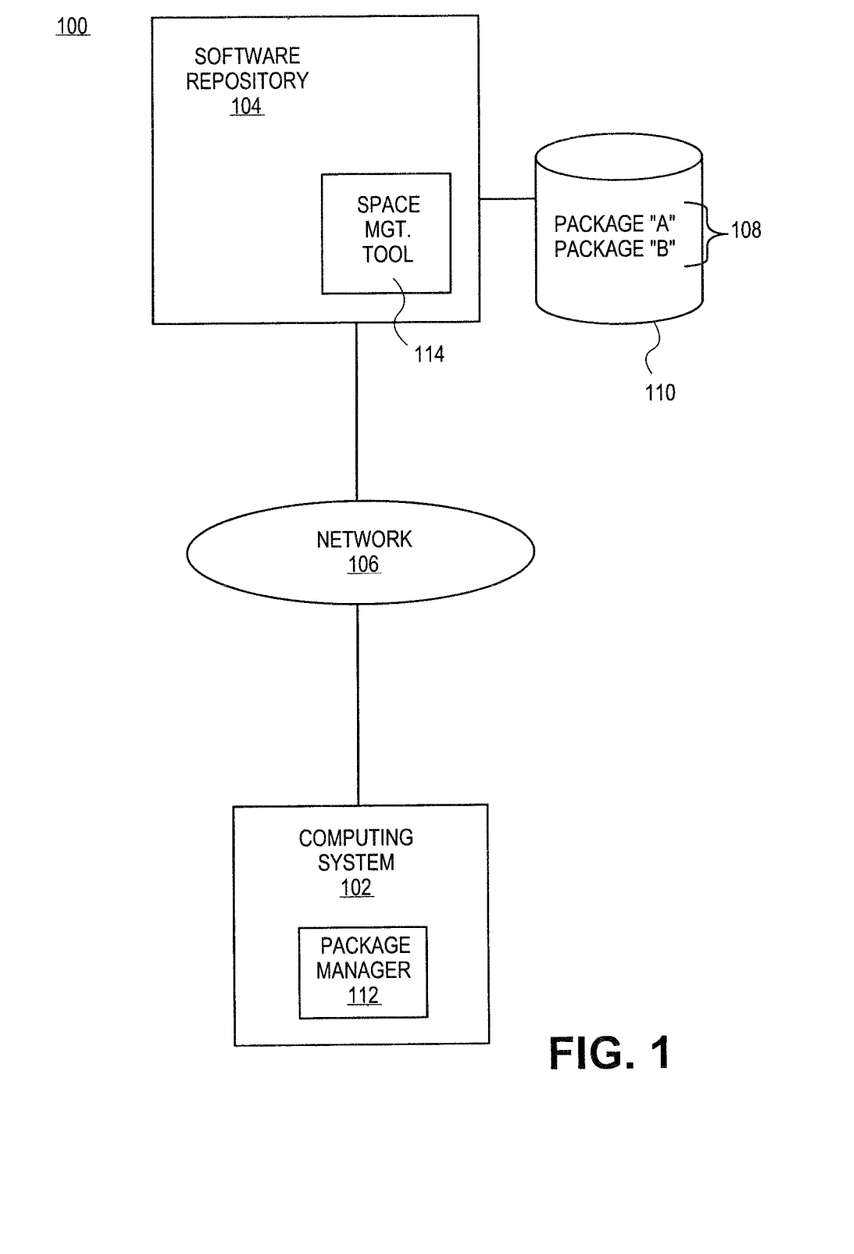
FIG. 1 illustrates an exemplary software package delivery and management system implementing a space management tool, in which various embodiments of the present teachings can be practiced.

FIG. 1 illustrates a software package delivery and management system 100, according to various embodiments of the present teachings. While FIG. 1 illustrates various components that can be included in the software package delivery and management system 100, one skilled in the art will realize that additional components can be added or existing components can be removed.

In embodiments, as illustrated in FIG. 1, the software package delivery and management system 100 can be designed to allow a computing system 102 to communicate with a software repository 104, via one or more networks 106, in order to obtain one or more software packages 108. The software repository 104 can be implemented as any type of open-source or proprietary software repository, which can store the software packages 108 and provide the software packages to computing systems, such as the computing system 102, requesting the software packages via the one or more networks 106. For example, the software repository 104 can be implemented as a Yellowdog Updater, Modified (Yum) repository, Debian™ repository, or any other type of conventional software repository.

In embodiments, as described herein, the software packages 108, can include one or more software programs that are packaged together as a set of files in a format that allows a package manager or package installer to install the software programs, contained in the software packages 108, on a computing system. The software packages 108 can be stored in one or more computer readable storage media and devices 110 (CD, DVD, hard drive, portable storage memory, etc.).

In embodiments, the software programs included in the software packages 108 can be any type of software programs such as operating systems (OS), application programs, and the like. The software packages 108 can also include metadata that describes the software package, such as the name of the software package, the software programs included in the package, version of the software package, description of the purpose of the software package, etc. The software packages 108 can also include metadata that aids in the installation of the software programs contained in the software packages 108, such as checksums and a list of dependencies of the software package. The list of dependencies can describe the relationship of the software programs contained in the software packages 108 and any other software programs, file, software libraries, etc. required by the software packages 108.

In embodiments, the software repository 104 can store the files of the software packages 108 in any type of open-source or proprietary format depending on the type of the software repository 104. For example, the files of the software packages 108 can be in conventional formats such as RPM format for a Yum repository, .deb format for a Debian™ repository, or other conventional formats.

In embodiments, the software repository 104 can be supported by any type of computing system capable of storing the software packages 108, capable of communicating with the one or more networks 106, and capable of running an operating system and a repository application for cooperating with a package manager or package installer in order to deliver the software packages 108. For example, the software repository 104 can be supported by conventional computing systems or other devices such as such as servers, personal computers, laptop computers, network-enabled media devices, networked stations, etc. As such, the computing system supporting the software repository 104 can include conventional hardware such as processors, memory, computer readable storage media and devices (CD, DVD, hard drive, portable storage memory, etc.), network devices, and the like.

In embodiments, the one or more networks 106 can be or include the Internet, or other public or private networks. The one or more or more networks 106 can be or include wired, wireless, optical, and other network connections. One skilled in the art will realize that the one or more networks 106 can be any type of network, utilizing any type of communication protocol, to connect computing systems.

In embodiments, the computing system 102 can be any type of conventional computing system or other device such as such as servers, personal computers, laptop computers, network-enabled media devices, networked stations, etc. As such, the computing system 102 can include conventional hardware such as processors, memory, computer readable storage media and devices (CD, DVD, hard drive, portable storage memory, etc.), network devices, and the like.

In embodiments, the computing system 102 can be configured to include a package manager 112. The package manager 112 can be configured to cooperate with the software repository 104 to perform various actions associated with the software packages 108. For example, the package manager 112 can be configured to retrieve one or more of the software packages 108 and configured to install the software packages on the computing system 102 Likewise, the package manager 112 can be configured to retrieve updates to software packages 108, already installed on the computing system 102, and install the updates on the computing system 102.

In embodiments, the package manager 112 can be any application program that is capable of executing on the computing system 102 to perform the actions related to the software repository 104. For example, the package manager 112 can be any type of conventional open-source or proprietary package manager such as Yum package manager, Debian™ package manager, and the like. The package manager 112 can be stored on computer readable storage devices or media (CD, DVD, hard drive, portable storage memory, etc.) of the computing system 102 and executed by the computing system 102.

In embodiments, the software packages 108 maintained by the software repository 104 can include overlapping content. As such, the software packages 108 can include duplicate files for the same software programs. For example, software package "A" can be a particular distribution of the operating system (OS) Fedora.™., such as Fedora 11, and can include all the files for the complete installation of Fedora 11. Additionally, software package "B" can be a compilation of updates to update previous distributions of Fedora to Fedora 11 and can include only the files necessary to update Fedora. The software repository 104 can store the files of the software packages 108 in separate and distinct locations in the computer readable storage medium 110.

In embodiments, in order to conserve storage space of the computer readable storage medium 110, the software repository 104 can be configured to utilize the space management tool 114. The space management tool 114 can be configured to consolidate the duplicate files in the software packages 108 while maintaining the file structure of the software packages 108. To achieve this, the space management tool 114 can be configured to search the software packages 108 to identify duplicate files and consolidate the duplicate files without altering the file structure of the software packages 108. In particular, the space management tool 114 can be configured to consolidate the storage space utilized by the software packages 108 by removing duplicate files in the software packages 108 and replacing the removed files with a reference to the remaining file.

In embodiments, the space management tool 114 can be implemented as an application program that is capable of executing on the software repository 104 to perform the processes as described above. Likewise, the space management tool 114 can be implemented as a portion of any of the program supporting the software repository 104 (e.g. repository application, OS, and the like). In either case, the space management tool 114 can be stored on computer readable storage devices or media 110 (CD, DVD, hard drive, portable storage memory, etc.) of the software repository 104 and executed by the software repository 104.

Figure 2:
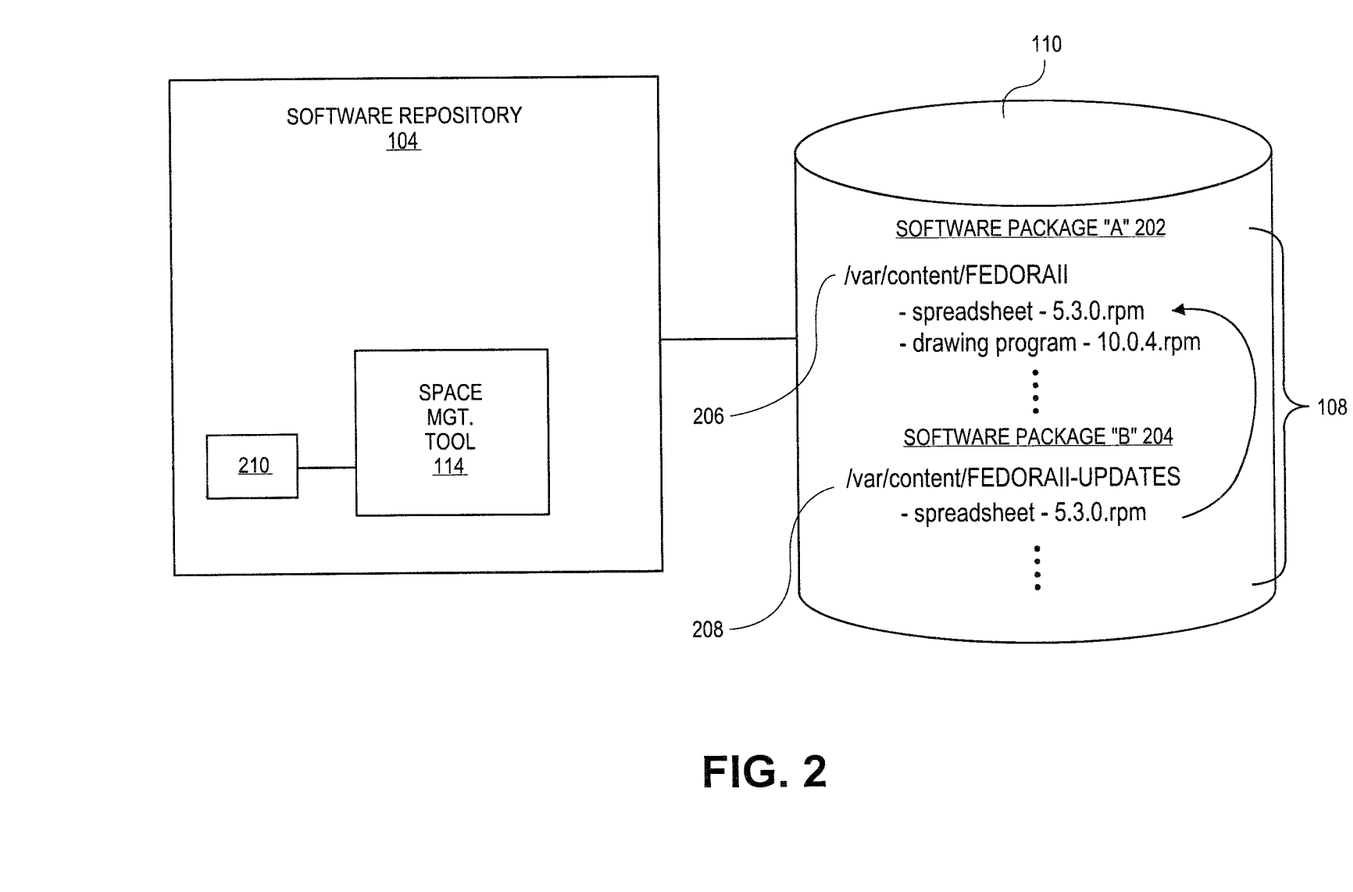
FIG. 2 illustrates a software repository implementing the space management tool, according to various embodiments.

FIG. 2 illustrates the software repository 104 implementing the space management tool 114 according to various embodiments of the present teachings. While FIG. 2 illustrates various components that can be included in the software repository 104, one skilled in the art will realize that additional components can be added or existing components can be removed.

In embodiments, as described above, the software repository 104 can maintain multiple software packages 108 such as a software package "A" 202 and software package "B" 204. As illustrated, the software packages 108 maintained by the software repository 104 can include overlapping content. The software packages 108 can include overlapping content for a variety of reasons. For example, the software repository 104 can be the main repository for the software package "A" 202 and, additionally, can be a mirror repository for the software package "B" 204. Additionally, the software package "A" 202 and the software package "B" 204 can contain overlapping content because the software packages 108 contain a set or sub-set of the same software programs. As such, the software packages 108 can include duplicate files for the same software programs. For example, software package "A" 202 can be a particular distribution of the OS Fedora, such as Fedora 11, and can include the files "spreadsheet—5.3.0.rpm", "drawingprogram—10.0.4.rpm", and other files for the complete installation of Fedora 11. Additionally, software package "B" can be a compilation of updates to update previous distributions of Fedora to Fedora 11 and can include the file "spreadsheet—5.3.0.rpm" and other files to update Fedora.

In embodiments, as illustrated, the files for the software packages 108 can be stored at separate locations in the file system of the computer readable storage medium 110. For example, the files for the software package "A" 202 can be stored at a location 206, such as "/var/content/fedora11". Likewise, the files for the software package "B" 204 can be stored at a separate and distinct location 208, such as "/var/content/fedora11—updates". As such, separate storage space in the computer readable medium 110 can be required to store both the software package "A" 202 and the software package "B" 204.

In embodiments, in order to conserve storage space of the computer readable storage medium 110, the software repository 104 can be configured to utilize to space management tool 114. The space management tool 114 can be configured to consolidate the duplicate files in the software packages 108 while maintaining the file structure of the software packages 108. To achieve this, the space management tool 114 can be configured to search the software packages 108 to identify duplicate files and consolidate the duplicate files without altering the file structure of the software packages 108.

In embodiments, the space management tool 114 can be configured to search the software packages 108 to identify duplicate files in the software packages. In particular, the space management tool 114 can be configured to search the storage locations of the software packages 108 to identify the files with the same or identical file name. For example, if software repository 104 contains the software package "A" 202 and the software package "B" 204, the space management tool 114 can search the storage locations "/var/content/fedora11" 206 and "/var/content/fedora11—updates" 208 to identify the duplicate files "spreadsheet—5.3.0.rpm".

In embodiments, once the duplicate files are located, the space management tool 114 can be configured to consolidate the duplicate files. To achieve this, the space management tool 114 can be configured to remove some of the duplicate files. To remove the duplicate files, the space management tool 114 can be configured to delete the duplicate files. For example, as illustrated, if the space management tool 114 identifies two duplicate files "spreadsheet—5.3.0.rpm", the space management tool 114 can delete one of the two duplicate files. Likewise, if the space management tool 114 locates more than two duplicate files, the space management tool 114 can be configured to remove one or more of the duplicate files while leaving at least one duplicate file.

In embodiments, once some of the duplicate files are removed, the space management tool 114 can be configured to replace the removed duplicate files with a reference to the remaining duplicate file. The reference can be configured as a file which points to the storage location of the remaining duplicate file, has the same name as the removed duplicate files, and is stored at the same location as the removed duplicate files. As such, the software package with the removed duplicate file would maintain the same file structure and could be utilized in installations without altering the software package. The space management tool 114 can be configured to create the reference and to store the reference in the storage location of the removed duplicate file. For example, if the space management tool 114 identifies two duplicate files "spreadsheet—5.3.0.rpm" and removes the duplicate file stored at location 208, the space management tool 114 can store at location 208 a reference to the "spreadsheet—5.3.0.rpm" file stored at location 206.

In embodiments, the space management tool 114 can be configured to utilize any type of reference to replace duplicate files and reference the location of the remaining duplicate file. For instance, the space management tool 114 can be configured to utilize hard links that are supported by distributions of the Unix.™. OS or Linux.™. OS. A hard link is an additional file name referencing an existing file in the file system. When a hard link is created, the OS makes no distinction between the name that was originally assigned to a file when it was first created and any hard links that are subsequently created to that file, i.e. the hard links are multiple names for the same file. To achieve this, the original file name and any hard links all point to the same inode. An inode is a data structure that stores all the information about a file (e.g., its size, its access permissions, when it was created and where it is located on the system) except the files name and its actual data.

In embodiments, likewise, the space management tool 114 can be configured to utilize symbolic links or soft links, supported by distributions of the Unix™ OS or Linux™ OS, as the reference for the removed duplicate files. A symbolic link is a file that contains a reference to another file or directory in the form of an absolute or relative path and that affects pathname resolution. A symbolic link can be configured to include a text string that is interpreted and followed by the OS as a path to another file or directory. A symbolic link can be utilized to reference files stored in directories of the same file system as well as to files on different file systems, on different partitions of a computer readable storage medium, and/or on different computer readable storage media. While hard links and symbolic links have been described above, one skilled in the art will realize that the space management tool 114 can utilize any type of reference to replace removed duplicate files.

In embodiments, in order to perform the space management as described above, the space management tool 114 can be configured to include the necessary commands, logic, instructions, and interfaces to search the computer readable storage medium 110 to identify duplicate files and to remove and replace duplicate files with a reference to the remaining duplicate files. For instance, the space management tool 114 can be configured to include an application programming interface (API) to communicate with the OS of the software repository 104 in order to search the file system of the computer readable storage medium 110 and to remove and replace duplicate files with a reference to the remaining duplicate file.

In embodiments, the space management tool 114 can be configured to maintain a record 210. The record 210 can be configured to contain a record of the storage locations of the software packages 108, such as "/var/content/fedora11" and "/var/content/fedora11—updates". Likewise, the record 210 can be configured to contain a record of the files stored in the locations. As such, the space management tool 114 can be configured to utilize the record 210 to identify the storage locations of the software packages 108 and the files stored in the storage locations.

In embodiments, the space management tool 114 can be configured to perform the space management processes described above upon the occurrence of any number of events. For example, the space management tool 114 can be configured to perform the processes on demand. For instance, the space management tool 114 can be configured to include the necessary logic, commands, instructions, and interfaces to generate command line interfaces and/or graphical user interfaces (GUIs) that allow a user of the software repository 104 to initiate the space management processes. Additionally, the space management tool 114 can be configured to automatically perform the space management processes. For example, the space management tool 114 can be configured to perform the space management processes upon the occurrence of certain conditions such as when new software packages are added to the software repository 104. Accordingly, the space management tool 114 can be configured to include the necessary logic, commands, instructions, and interfaces to generate command line interfaces and/or GUIs that allow a user of the software repository 104 to select the conditions upon which the space management tool 114 can automatically perform the space management processes.

In embodiments, as described above, the software packages 108 can be stored on a single partition of the computer readable storage medium 110. Likewise, the software packages 108 can be stored on different partitions of a computer readable storage medium and/or on different computer readable media. As such, the space management tool 114 can be configured to perform the space management processes described above for duplicate files stored on different partitions and/or different computer readable media. For instance, the space management tool 114 can be configured to utilize a reference that points at different file systems of different partitions and/or different computer readable media, such as symbolic links.

Figure 3:
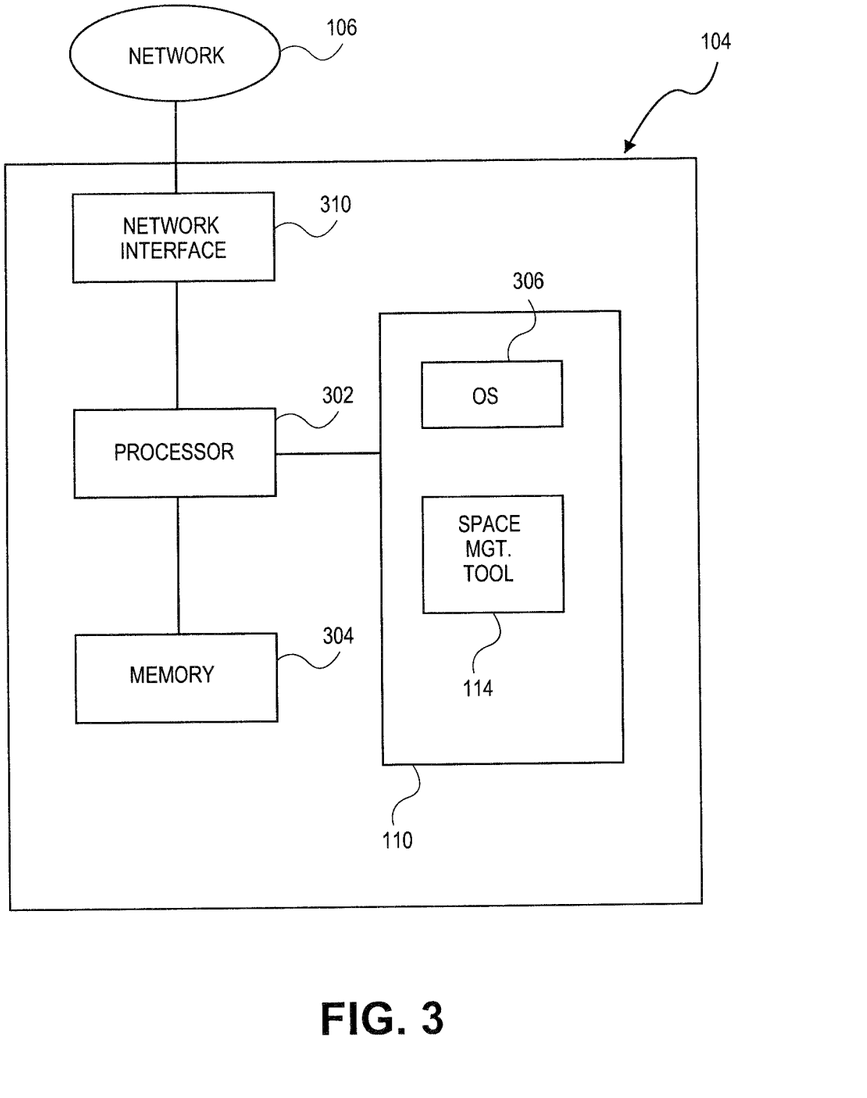
FIG. 3 illustrates an exemplary hardware configuration for a software repository, according to various embodiments.

FIG. 3 illustrates an exemplary diagram of hardware and other resources that can be incorporated in the software repository 104, according to embodiments. In embodiments as shown, the software repository 104 can comprise a processor 302 communicating with memory 304, such as electronic random access memory, operating under control of or in conjunction with operating system 306. Operating system 306 can be, for example, a distribution of the Linux™ operating system, such as Red Hat™ Enterprise Linux, Fedora, etc., the Unix™ operating system, or other open-source or proprietary operating system or platform. Processor 302 also communicates with one or more computer readable storage devices or media 110, such as hard drives, optical storage, and the like, for maintaining the operating system 306, and the space management tool 114. Processor 302 further communicates with network interface 310, such as an Ethernet or wireless data connection, which in turn communicates with one or more networks 106, such as the Internet or other public or private networks.

Processor 302 also communicates with the space management tool 114 to execute control logic and allow performance of the space management processes as described above and below. Other configurations of the software repository 104, associated network connections, and other hardware and software resources are possible.

While FIG. 3 illustrates the software repository 104 as a standalone system including a combination of hardware and software, the software repository 104 can include multiple systems operating in cooperation. The space management tool 114 can be implemented as a software application or program capable of being executed by the software repository 104, as illustrated, or other conventional computer platforms. Likewise, the space management tool 114 can also be implemented as a software module or program module capable of being incorporated in other software applications and programs, such as repository application or operating system 306. In any example, the space management tool 114 can be implemented in any type of conventional proprietary or open-source computer language. When implemented as a software application or program code, the space management tool 114 can be stored in a computer readable storage medium, such as medium 110, accessible by the software repository 104. Likewise, during execution, a copy of the space management tool 114 can be stored in the memory 304.

Figure 4:
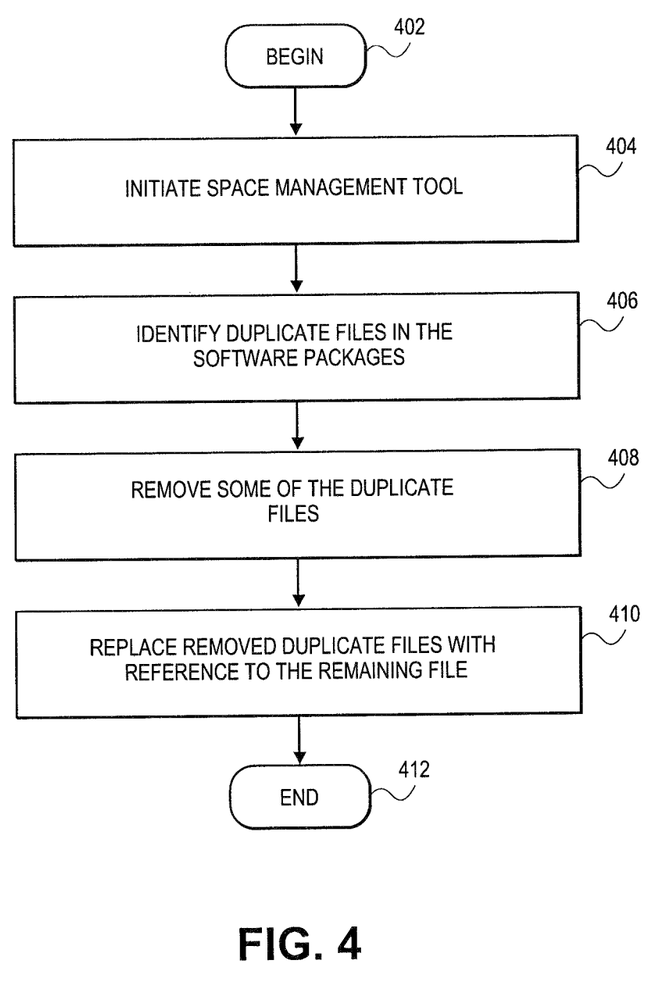
FIG. 4 illustrates a flowchart of an exemplary process for storage space management in a software repository, according to various embodiments.

FIG. 4 illustrates a flow diagram for space management in a software repository, according to embodiments of the present teachings. In 402, the process can begin. In 404, the space management tool 114 can be initiated. The space management tool 114 can be initiated upon the occurrence of any number of events. For example, the space management tool 114 can be initiated on demand. Additionally, the space management tool 114 can automatically be initiated.

In 406, the space management tool 114 can identify duplicate files in the software packages 108. For example, the space management tool 114 can search the storage locations of the software packages 108 for files with the same or identical file names.

In 408, the space management tool 114 can remove one or more of the duplicate files in the software packages 108. For example, the space management tool 114 can delete one or more of the duplicate files. For instance, if the space management tool 114 identifies two duplicate files, the space management tool 114 can delete one of the two duplicate files. Likewise, if the space management tool 114 locates more than two duplicate files, the space management tool 114 can remove one or more of the duplicate files while leaving at least one duplicate file.

In 410, the space management tool 114 can replace the removed duplicate files with a reference to the location of the remaining file in the software packages 108. The reference can be configured as a file which points to the storage location of the remaining file, has the same name as the removed duplicate files, and is stored at the same location as the removed duplicate files. As such, the software package with the removed duplicate file would maintain the same file structure and could be utilized in installations without altering the software package. The space management tool 114 can create the reference and store the reference in the storage location of the removed duplicate file.

In 412, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   determining, by a processor, a plurality of duplicate files, each of the plurality of duplicate files being associated with a different software package of a set of software packages stored in a computer readable storage device and each of the software packages comprising a file structure;
   removing, by the processor, one of the plurality of duplicate files from a storage location in the computer readable storage device; and
   storing, by the processor, in the storage location, a reference to a remaining one of the plurality of duplicate files, wherein the file structure of each of the software packages is maintained.

2. The method of claim 1, the method further comprising:
   determining, by the processor, locations of the set of software packages stored in the computer readable storage device.

3. The method of claim 1, wherein determining the plurality of duplicate files comprises:
   comparing files contained in the set of software packages to determine files with identical file names.

4. The method of claim 1, wherein the reference comprises a hard link to a storage location of the remaining one of the plurality of duplicate files in the computer readable storage device.

5. The method of claim 1, wherein the removed one of the plurality of duplicate files was stored in a first file system of the computer readable storage device and the remaining one of the plurality of duplicate files is stored in a second file system of the computer readable storage device.

6. The method of claim 1, wherein the reference comprises a symbolic link to a storage location of the remaining one of the plurality of duplicate files in the computer readable storage device.

7. The method of claim 1, wherein the removed one of the plurality of duplicate files was stored in a first computer readable storage device and the remaining one of the plurality of duplicate files is stored in a second computer readable storage device.

8. A non-transitory computer readable storage device having instructions therein, which when executed, cause a processor to perform operations comprising:
   determining, by the processor, a plurality of duplicate files, each of the plurality of duplicate files being associated with a different software package of a set of software packages stored in a memory and each of the software packages comprising a file structure;
   removing, by the processor, one of the plurality of duplicate files from a storage location in the memory; and
   storing, by the processor, in the storage location, a reference to a remaining one of the plurality of duplicate files, wherein the file structure of each of the software packages is maintained.

9. The non-transitory computer readable storage device of claim 8, wherein the operations further comprise:
   determining, by the processor, locations of the set of software packages stored in the memory.

10. The non-transitory computer readable storage device of claim 8, wherein determining the plurality of duplicate files comprises:
    comparing, by the processor, files contained in the set of software packages to determine files with identical file names.

11. The non-transitory computer readable storage device of claim 8, wherein the reference comprises a hard link to a storage location of the remaining one of the plurality of duplicate files in the memory.

12. The non-transitory computer readable storage device of claim 8, wherein the removed one of the plurality of duplicate files was stored in a first file system of the memory and the remaining one of the plurality of duplicate files is stored in a second file system of the memory.

13. The non-transitory computer readable storage device of claim 8, wherein the reference comprises a symbolic link to a storage location of the remaining one of the plurality of duplicate files in the memory.

14. The non-transitory computer readable storage device of claim 8, wherein the removed one of the plurality of duplicate files was stored in a first memory and the remaining one of the plurality of duplicate files is stored in a second memory.

15. A system comprising:
    a computer readable storage device; and
    a processor, to communicate with the computer readable storage device and to execute a space management tool, wherein the space management tool is to:
       determine a plurality of duplicate files, each of the plurality of duplicate files being associated with a different software package of a set of software packages stored in the computer readable storage device and each of the software packages comprising a file structure;
       remove one of the plurality of duplicate files from a storage location in the computer readable storage device; and
       store, in the storage location, a reference to a remaining one of the plurality of duplicate files, wherein the file structure of each of the software packages is maintained.

16. The system of claim 15, wherein the space management tool is further to:
    determine locations of the set of software packages stored in the computer readable storage device.

17. The system of claim 15, wherein determining the plurality of duplicate files comprises:
    comparing files contained in the set of software packages to determine files with identical file names.

18. The system of claim 15, wherein the reference comprises a hard link to a storage location of the remaining one of the plurality of duplicate files in the computer readable storage device.

19. The system of claim 15, wherein the removed one of the plurality of duplicate files was stored in a first file system of the computer readable storage device and the remaining one of the plurality of duplicate files is stored in a second file system of the computer readable storage device.

20. The system of claim 15, wherein the reference comprises a symbolic link to a storage location of the remaining one of the plurality of duplicate files in the computer readable storage device.

* * * * *